United States Patent [19]

Birchall

[11] Patent Number: 5,211,871

[45] Date of Patent: May 18, 1993

[54] WATER TREATMENT AGENT

[75] Inventor: James D. Birchall, Mouldsworth, England

[73] Assignee: Imperial Chemical Industreis PLC, London, England

[21] Appl. No.: 901,974

[22] Filed: Jun. 22, 1992

Related U.S. Application Data

[62] Division of Ser. No. 828,111, Jan. 30, 1992, Pat. No. 5,149,439.

[30] Foreign Application Priority Data

Feb. 11, 1991 [GB] United Kingdom ............... 9102796

[51] Int. Cl.$^5$ ............................................. C02F 1/62
[52] U.S. Cl. .................................... 252/175; 428/404
[58] Field of Search ............... 252/175, 176; 428/403, 428/404; 427/215; 210/912, 504, 506, 702, 716; 423/118, 122, 327, 328

[56] References Cited

U.S. PATENT DOCUMENTS

| | | | |
|---|---|---|---|
| 2,660,541 | 11/1953 | Rinkenbach | 427/215 |
| 3,737,044 | 6/1973 | Chamberlin et al. | 210/501 |
| 3,770,652 | 11/1973 | Gordon, Jr. | 252/175 |
| 3,967,039 | 6/1976 | Ninane et al. | 427/215 |
| 4,293,426 | 10/1981 | Gago | 427/215 |
| 4,404,105 | 9/1983 | de Lockerente et al. | 210/710 |
| 4,822,579 | 4/1989 | Wagner | 210/198.1 |

FOREIGN PATENT DOCUMENTS

| | | |
|---|---|---|
| 0403244 | 12/1990 | European Pat. Off. . |
| 0435176 | 7/1991 | European Pat. Off. . |
| 16358 | 2/1978 | Japan ................ 210/726 |

OTHER PUBLICATIONS

World Patents Index Week, 8825, Derwent, AN 88,173451 (SU-A-1353767).

Primary Examiner—Stanley S. Silverman
Assistant Examiner—Neil M. McCarthy
Attorney, Agent, or Firm—Cushman, Darby & Cushman

[57] ABSTRACT

An agent for the treatment of water containing dissolved aluminum comprises a particulate alkali metal or quaternary ammonium silicate, the particles having a coating of a water-insoluble silicate over at least a part of their surface, and a process of treating water which comprises dissolving the agent in the water.

9 Claims, No Drawings

WATER TREATMENT AGENT

This is a division of application Ser. No. 07/828,111, filed Jan. 30, 1992 now U.S. Pat. No. 5,149,439.

This invention relates to a water treatment agent, particularly an agent for the treatment of acidic water to improve its environmental and potable acceptability, and to the use of the agent for the treatment of water.

Acidic waters, such as are obtained for example, by the collection of so-called acid rain, contain dissolved aluminium at levels known to be harmful to fish in lakes and rivers and considered by some authorities to be deleterious to roots such as tree roots. It is known also that the presence of dissolved aluminium in the water used in renal dialysis is dangerous to patients who may develop neurological disorders and bone pathology.

Aluminium is essentially insoluble in neutral or alkaline water but its solubility increases as the acidity of water increases, that is as the pH of the water decreases. At pH 6 or below aluminium is soluble to toxic levels and its presence in acidic waters may result for example from contact of the water with aluminium-bearing rocks and soils or from the use of aluminium slats such as alum as a flocculent in water treatment systems.

It is known that the deleterious effect of aluminium on fish and trees can be minimised by decreasing the acidity (increasing the pH) of acidic water, whereby the solubility of aluminium in the water is decreased. Thus in the treatment of acidic lakes, rivers and streams and the catchment areas that feed them, it is common practice to treat the water with an alkali such as an alkali or alkaline earth metal carbonate. Alkalis containing calcium are preferred to those containing alkali metals since it is thought that calcium ions have a beneficial effect in increasing the tolerance of fish to impurities in the water. The alkali most commonly employed is calcium carbonate in the form of limestone.

It has also been proposed in European Patent Application No. 90306431.9 to detoxify water containing aluminium by treatment of the water with silicon (in the form of silicic acid) in an amount sufficient to create a large excess of silicon with respect to aluminium and hence reduce the deleterious effect on the environment of the aluminium in the water. Detoxification of water with silicon is more effective than is obtained by treatment of the water with alkali alone and is not dependent upon increasing the pH of the water although the pH of the water may be increased when silicon (or silicic acid) is dissolved in the water.

Silicon may be introduced into the water to be treated in one or more of a variety of forms, for example it may be introduced in the form of an alkali metal silicate. One particular form of alkali metal silicate which may be used is an alkali metal silicate glass. Alkali metal silicate glasses are made by fusion of silica with the appropriate alkali metal oxide or carbonate and they may be ground to very fine powders. These powders dissolve readily in water to produce silicic acid and alkali metal hydroxide.

However, these alkali metal silicates and in particular alkali metal silicate glasses suffer from a disadvantage when they are used for the treatment of water in that their dissolution in water may be very rapid so that they may have effect for only a short period of time and the pH of the water being treated may rise rapidly to unacceptable and harmful levels due to the formation of alkali metal hydroxide as well as silicic acid when they dissolve. Furthermore, the powders become easily caked in moist conditions and do not easily flow. Due to their rapid dissolution with the formation of alkali metal hydroxide, and the presence of moisture in the skin, skin irritation can follow contact.

The present invention is intended to remedy these drawbacks and provides an agent for the treatment of water containing dissolved aluminium which may release silicic acid into the water at a slower and more controllable rate than previous agents.

According to the present invention there is provided an agent for the treatment of water containing dissolved aluminium which agent comprises a particulate alkali metal or quaternary ammonium silicate, the particles having a coating of a water-insoluble silicate over at least a part of their surface.

The invention also provides the use of the aformentioned agent for the treatment of water, and a process of treating water which comprises dissolving in the water an agent comprising a particulate alkali metal or quaternary ammonium silicate, the particles having a coating of a water-insoluble silicate over at least a part of their surface.

The alkali metal silicate may be, and preferably is an alkali metal silicate glass which has been ground into the form of a powder, although the alkali metal silicate may take other forms, for example, an alkali metal metasilicate. Alkali metal silicate glasses are preferred for use in the invention due to their ready availability.

Alternatively, a particulate quaternary ammonium silicate may be used instead of an alkali metal silicate, although alkali metal silicates are preferred due to their more ready availability.

The particular alkali metal silicate chosen may depend at least to some extent on the environment in which the water is to be treated. Sodium silicate glass is readily available and is usually used for treating bulk water, for example lakes and rivers or the water feed to a water treatment works, whilst potassium silicate glasses may be preferred where water in soil is to be treated since potassium is a nutrient element and in use of the agent potassium ions will be released into the soil.

The size of the particles of the alkali metal silicate may vary within a wide range. Generally, the average particle size will be not less than 5 micrometers since below this size, the alkali metal silicate may take the form of a dust and may be difficult to handle in practice. The particles may be in the form of pellets, that is, the particle size may be large, for example up to 5 millimeters. Typically the average particle size will be between 10 micrometers and 5 millimeters, preferably between 10 micrometers and 1 millimeters although the invention is not limited to these ranges.

The particles of alkali metal silicate are treated to form a coating of a water-insoluble silicate over at least a part of the surface of the particles. It is to be understood that the invention is not to be limited to coatings of completely water-insoluble silicates but that by a water-insoluble silicate, there is meant a silicate which may dissolve in water only to a very small degree. Preferably the water-insoluble silicate has a solubility product of less than $10^{-10}$, and more preferably less than $10^{-15}$. It is believed that the water-insoluble silicate is however porous and permeable to water, and that the coating acts like a semi-permeable membrane allowing water to permeate through it and thus causing the coating to "crack".

Preferably, the water-insoluble silicate is a water-insoluble metal silicate, in which case the treatment may be carried out, for example, by immersing the particles of alkali metal silicate in a solution of a metal salt, for example an aqueous solution of a metal salt, which reacts with the alkali metal silicate to form an insoluble metal silicate on the surface of the particles, filtering out the coated particles and drying them. The metal which forms an insoluble metal silicate may be, for example, magnesium, calcium, iron, manganese, or zinc. Preferably the metal is iron or manganese since in use of the agent, these ions, which are nutrient elements, are released into the environment being treated.

Alternatively, instead of a coating of an insoluble metal silicate, a coating of hydrogen silicate, i.e. hydrated silica, may be formed on the surfaces of the particles of alkali metal silicate. This may be achieved by immersing the particles of alkali metal silicate in, for example, an acid solution, for example in an aqueous hydrogen chloride solution.

Typically, he particles will have a coating over the whole of their surface although the invention is not to be so limited and the particles may have only a partial coating, in particular where the particles are of a larger size, depending on the extent to which the rate of dissolution of the alkali metal silicate is to be reduced. A partial coating may be formed on larger particles, by, for example, only partly immersing the particles in, for example, a metal salt solution which forms an insoluble metal silicate, or in an acid solution.

The thickness of the coating of water-insoluble silicate on the particles of alkali metal or quaternary ammonium silicate may be within a wide range, and the desired thickness may be controlled by, for example, controlling the length of time for which the particles of alkali metal or quaternary ammonium silicate are immersed in the metal salt or acid solution.

Generally the thickness of the coating is in the range from about 0.1 microns to about 100 microns, the preferred coating thickness depending to some extent upon the particle size of the alkali metal or quaternary ammonium silicate and upon the desired rate of dissolution of the agent.

Thus, where the alkali metal or quaternary ammonium silicate has a small particle size, for example in the range from about 5 microns to about 100 microns, the coating thickness is preferably in the rang from about 1 micron to about 20 microns. Where the alkali metal silicate or quaternary ammonium silicate has a larger particle size, for example a particle size form about 0.5 millimeters to about 5 millimeters, the thickness of the coating is preferably from about 50 microns to about 100 microns, although the invention is not limited to these ranges.

The desired rate of dissolution may vary according to the environment and characteristics of the water to be treated, for example whether a large body of flowing water, for example a river or the water feed to a water treatment works, or a relatively small body of static water, for example soil water, is to be treated.

The rate of dissolution depends, inter alia, on the particle size of the alkali metal silicate, the particular cation of the water-insoluble silicate coating and the thickness of the insoluble coating. The rate of dissolution may therefore be controlled by suitable choice of these parameters so that controlled release characteristics may be achieved for different environments to be treated which may have different requirements.

In the case of particle size, decreasing the average particle size will, for a given coating thickness, reduce the rate of dissolution due to the increased proportion of the coating present and increasing the average particle size will increase the rate of dissolution. For much the same reasons, increasing the thickness of the coating will, for a given particle size, decrease the rate of dissolution. Increasing the thickness of the coating may be achieved, as described previously, by increasing the time for which the alkali metal silicate particles are left immersed in, for example, a metal salt solution, or in an acid solution.

In the process of the invention an agent as herein described is dissolved in the water to be treated. The rate of dissolution of the agent and the amount of agent used are preferably chosen such that the water to be treated contains at least 40 micromoles per litre of dissolved silicon and more preferably at least 100 micromole per litre of dissolved silicon.

The invention is illustrated by the following example in which the sodium silicate glass was obtained from ICI Chemicals and Polymers Ltd.

EXAMPLE

Sodium silicate glass was ground to an average particle size of 20 micrometers (range 5 micrometers to 100 micrometers) and the powder was divided into three portions. A first portion was immersed in (a) 1M aqueous $MgCl_2$ solution and a second portion was immersed in (b) 1M aqueous $CaCl_2$ solution, and both solutions were agitated using a magnetic stirrer. After 1 hour the solid in each case was filtered out and dried in an oven at 120° C. until the weight of he solid remained constant. The solids from (a) and (b) were analysed and were found to contain 0.33% Mg and 5.4% Ca respectively.

Each solid was then placed in a soxhlet tube and the tubes were suspended in pure water. A third soxhlet tube containing a third portion of untreated sodium silicate glass powder was also suspended in pure water. There was no agitation. The rate of diffusion of dissolved silica through each soxhlet and into the bulk water was measured by taking 50 ml samples from the bulk water at intervals of time and analysing the samples to determine the concentration of silica in the samples using the Molybdate Blue Test. The results are given in the table below.

| Time (hrs) | Silica Concentration $mgl^{-1}$. | | |
|---|---|---|---|
| | Sodium Silicate Glass Powder | $Ca^{2+}$ treated Powder | $Mg^{2+}$ treated Powder |
| 1 | 54 | 3 | 0.5 |
| 5 | 64 | 9 | 1.5 |
| 24 | 75 | 24 | 7.0 |

The results clearly show that the presence of an insoluble metal silicate coating on the particles of alkali metal silicate significantly reduces the rate of dissolution of silica, and that the extent of this reduction is dependent on the metal ion of the insoluble metal silicate.

I claim:

1. An agent for the treatment of water containing dissolved aluminium which agent comprises a particulate alkali metal or quaternary ammonium silicate, the particles having a coating of a water-insoluble silicate over at least a part of their surface.

2. An agent as claimed in claim 1 which comprises a particulate alkali metal silicate glass.

3. An agent as claimed in claim 2 which comprises sodium silicate or potassium silicate.

4. An agent as claimed in claim 3 in which the average particle size of the alkali metal or quaternary ammonium silicate is in the range from 10 microns to 5 millimeters.

5. An agent as claimed in claim 4 in which the average particle size of the alkali metal or quaternary ammonium silicate is in the range from 10 microns to 1 millimeter.

6. An agent as claimed in any one of claims 1 to 5 in which the water-insoluble silicate has a solubility product of less than $10^{-10}$.

7. An agent as claimed in claim 6 in which the water insoluble silicate has a solubility product of less than $10^{-15}$.

8. An agent as claimed in claim 1 in which the insoluble silicate is selected from the group consisting of magnesium silicate, calcium silicate, iron silicate, manganese silicate, zinc silicate and hydrated silica.

9. An agent as claimed in claim 8 in which the insoluble silicate is iron silicate or manganese silicate.

* * * * *